United States Patent [19]

Bánfi et al.

[11] 4,362,129

[45] Dec. 7, 1982

[54] STEAM GENERATOR USING WASTE HEAT FROM GLASS FURNACE

[75] Inventors: József Bánfi; Zoltán Lontay; Zoltan Vadas; Béla Wenzel, all of Budapest, Hungary

[73] Assignee: Energiagazdalkodasi Intezet, Budapest, Hungary

[21] Appl. No.: 89,388

[22] Filed: Oct. 30, 1979

[30] Foreign Application Priority Data

Oct. 31, 1978 [HU] Hungary .............................. EE 2595

[51] Int. Cl.³ .............................................. F22D 1/00
[52] U.S. Cl. .................................. 122/7 R; 122/20 B; 122/421; 122/470
[58] Field of Search .............. 122/7 R, 7 A, 7 B, 7 C, 122/7 D, 20 B, 421, 470

[56] References Cited

U.S. PATENT DOCUMENTS

| | | | |
|---|---|---|---|
| 1,151,676 | 8/1915 | Foersterling | 122/7 R |
| 1,619,244 | 3/1927 | Doherty | 122/7 R |
| 2,336,833 | 12/1943 | Badenhausen | 122/7 B |

Primary Examiner—Edward G. Favors
Attorney, Agent, or Firm—Karl F. Ross

[57] ABSTRACT

Flue gases from a glass-melting furnace, after passing through an elevated recuperator, descend through a vertical cooling column into a horizontal convective boiler before being exhausted into a smokestack. Entering water, circulating essentially in counterflow to the flue gases, is preheated in an exit compartment of the boiler and passes via a flow regulator into the main boiler chamber and thence into a bank of vertical pipes on the periphery of the column. On rising through these pipes, the water is partly converted to steam which is superheated in an entrance compartment of the boiler before being fed to a load, the remaining water being returned to the boiler chamber.

6 Claims, 1 Drawing Figure

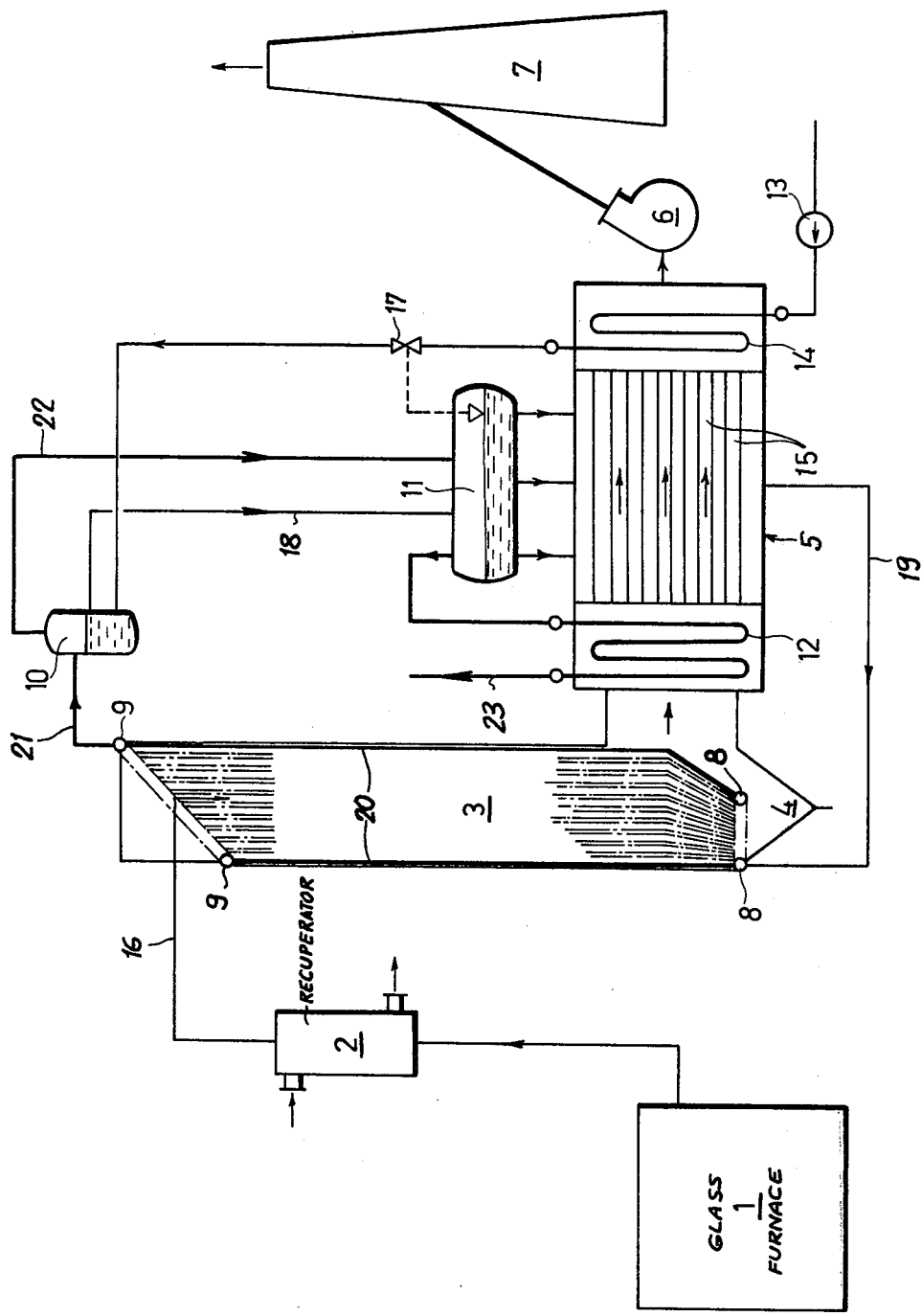

STEAM GENERATOR USING WASTE HEAT FROM GLASS FURNACE

FIELD OF THE INVENTION

Our present invention relates to a steam generator utilizing heat from a source of flue gases, especially a glass-melting furnace, provided with a recuperator.

BACKGROUND OF THE INVENTION

The large heat content of flue gases evolving from a high-temperature furnace such as that used in glass melting is primarily utilized in a metallic recuperator to preheat the combustion air of the furnace. In the glass-making industry it has become the practice to dispose such a recuperator in an elevated position above the level of the vitreous mass in order to allow entrained flux, such as borax, to drop back into the melt. The exit port of the recuperator, therefore, may lie as much as 10 to 20 meters above ground.

It has already been proposed to recover the still considerable residual heat of such flue gases with the aid of a waste-heat boiler comprising several vertical ducts traversed by the gases which leave the exit port of the recuperator. Mounting a boiler at such an elevated location requires a sturdy framework; its limited accessibility makes maintenance and inspection rather difficult and expensive.

OBJECT OF THE INVENTION

The object of our invention, therefore, is to provide an improved steam generator of the aforedescribed character which obviates these inconveniences.

SUMMARY OF THE INVENTION

We realize this object, in accordance with our present invention, by providing a two-part heat-recovery system comprising a cooling column with an upper inlet connected to the primary recuperator and with a lower outlet for flue gases received from that recuperator, and a convective boiler at ground level having an entrance end connected to the column outlet and an exit end communicating with a chimney or smokestack. The system further comprises conduit means extending from a supply of cooling water through the boiler and the column for carrying the water therethrough in counterflow to the flue gases whereby vaporization takes place in a bank of generally vertical pipes which form part of the conduit means and abstract heat from the descending flue gases in the column; the resulting steam is passed to a load, preferably after superheating by the flue gases leaving the column.

BRIEF DESCRIPTION OF THE DRAWINGS

The above and other features of our invention will now be described in detail with reference to the accompanying drawing the sole FIGURE of which diagrammatically illustrates a steam-generating plant embodying the present improvement.

SPECIFIC DESCRIPTION

The drawing shows a glass-melting furnace 1, not illustrated in detail, from which flue gases escape into an elevated recuperator 2 of conventional construction serving for the preheating of combustion air fed to the burners of the furnace. The flue gases leaving the recuperator, still at a very high temperature, pass through a duct 16 into the upper end of a cooling column 3 whose peripheral wall is formed by or lined with a bank of vertical pipes 20 exposed to radiant heat from the descending gases. At the bottom of the column, the gases move past a dust separator 4 into an entrance compartment of a convective boiler 5, traverse a set of horizontal ducts 15 in a main compartment thereof and leave via an exit compartment from which they are exhausted by a blower 6 into a chimney 7.

Cooling water delivered by pump 13 enters the exit compartment of the boiler 5 where it is preheated by the outflowing gases in an incoming section 14 of a set of conduits continuing past a throttle valve 17 to a vapor separator 10. An overflow connection 18 extends from this vapor separator to a steam chamber 11 of much larger volume forming part of the boiler 5 and communicating with its main compartment. Valve 17 is controlled by a float in chamber 11 to keep the water level therein substantially constant, thereby acting as a flow regulator. The water in the central part of boiler 5, heated by the flue gases passing through ducts 15, continues through a conduit 19 into a distributing manifold 8 at the lower end of column 3 whence it rises through the pipes 20 to a collecting manifold 9 at the top, being at least partly vaporized in the process. From manifold 9 the resulting wet steam flows through a connection 21 into vapor separator 10 whence the residual water and the steam are separately fed to chamber 11 via overflow connection 18 and a conduit 22, respectively. The steam thus collecting in the upper part of chamber 11 leaves same by way of an outgoing conduit section 12 passing through the entrance compartment of boiler 5 where the steam is superheated before being delivered to a load at 23.

Vapor separator 10 and associated conduits could be replaced by a plurality of such components connected in parallel.

Furnace 1 and boiler 5 are both regarded as situated at ground level even though, of course, neither of them needs to sit directly on the floor of the plant.

We claim:

1. A steam generator utilizing waste heat from a source of flue gases, provided with a recuperator traversed by said flue gases at an elevated level above ground, comprising:
    a cooling column with an upper inlet connected to said recuperator for receiving hot flue gases therefrom, said column being provided with a bank of generally vertical pipes abstracting heat from said flue gases and being further provided with a lower outlet for said flue gases;
    a convective boiler disposed at ground level and provided with an entrance end connected to said outlet and with an exit end communicating with a chimney;
    a supply of cooling water; and
    conduit means including said bank of pipes for consecutively carrying said cooling water from said supply through said boiler and said column in counterflow to said flue gases and for passing resulting steam to a load.

2. A steam generator as defined in claim 1 wherein said conduit means includes a flow regulator.

3. A steam generator as defined in claim 2 wherein said boiler is provided with a steam chamber receiving fresh water from said supply via an incoming section of said conduit means, said flow regulator comprising a valve in said incoming section controlled by a float in said steam chamber.

4. A steam generator as defined in claim 3, further comprising a vapor separator of smaller volume than said steam chamber inserted above the latter in said conduit means downstream of said incoming section and provided with an overflow connection to said steam chamber, said conduit means including an outgoing section passing from said bank of pipes by way of said vapor separator and said steam chamber to said load independently of said overflow connection.

5. A steam generator as defined in claim 4 wherein said boiler is divided into an entrance compartment, a main compartment and an exit compartment, said main compartment being traversed by ducts linking said entrance and exit compartments and providing a path for the circulation of water around said ducts from said steam chamber to said bank of pipes, said entrance and exit compartments being traversed only by said flue gases, said incoming section passing through said exit compartment for preheating the inflowing water, said outgoing section passing through said entrance compartment for superheating the steam traveling from said steam chamber to the load.

6. In combination, a steam generator as defined in claim 1, 2, 3, 4 or 5 and a glass-melting furnace constituting said source of flue gases.

* * * * *